United States Patent [19]
Takahashi et al.

[11] Patent Number: 6,091,216
[45] Date of Patent: Jul. 18, 2000

[54] MOTOR-DRIVING CIRCUIT

[75] Inventors: Hisashi Takahashi, Sagamihara; Hirokazu Yashiro, Ogaki; Takashi Kenjo, Koganei; Koichiro Shoji, Zama, all of Japan

[73] Assignee: Ibiden Co., Ltd., Ogaki, Japan

[21] Appl. No.: 09/100,231

[22] Filed: Jun. 19, 1998

[51] Int. Cl.[7] .................................................. H02K 23/00
[52] U.S. Cl. ........................ 318/254; 318/138; 318/439
[58] Field of Search .................................. 318/254, 439, 318/798–815, 138; 363/41

[56] References Cited

U.S. PATENT DOCUMENTS

| | | | |
|---|---|---|---|
| 5,043,642 | 8/1991 | Ohi | 318/254 |
| 5,162,709 | 11/1992 | Ohi | 318/254 |
| 5,168,186 | 12/1992 | Yashiro | 310/47 |
| 5,426,354 | 6/1995 | Bausch | 318/254 |
| 5,589,746 | 12/1996 | Lewis | 318/439 |
| 5,663,618 | 9/1997 | Adachi et al. | 318/254 |
| 5,723,957 | 3/1998 | Ishikawa | 318/254 |
| 5,767,653 | 1/1998 | DeFiore et al. | 318/811 |

FOREIGN PATENT DOCUMENTS

| | | |
|---|---|---|
| 0 837 549 | 4/1998 | European Pat. Off. . |
| 196 10 994 | 9/1997 | Germany . |
| 2228570 | 8/1990 | United Kingdom . |
| 97/25767 | 7/1997 | WIPO . |

*Primary Examiner*—Robert E. Nappi
*Assistant Examiner*—Rita Leykin
*Attorney, Agent, or Firm*—Pillsbury Madison & Sutro, LLP

[57] ABSTRACT

When a brushless motor is rotated at low speeds (the answer of a step S12 is YES), the brushless motor is driven by exciting a first phase coil, a second phase coil and a third phase coil by a sine wave PWM system having a phase difference of 120° from each other to perform a torque control. Since the crest value of the sine wave is controlled in response to torque greatly fluctuated by a load, an out-of-phase phenomenon which is apt to occur at low rotational speeds can be previously prevented. When the brushless motor is rotated at high speeds (the answer of the step S12 is NO), the brushless motor is driven by a square wave PWM system based on a three-phase 120° conduction type. Since the out-of-phase phenomenon is apt to occur as a frequency is increased when the brushless motor is driven by the sine wave PWM system, the control system is switched to a square wave PWM system to prevent the out-of-phase phenomenon. Therefore, the brushless motor can be driven smoothly without much pulsating torque over the full range of revolutions from a low speed (zero revolution) to high speeds (several tens of thousands of revolutions/min).

7 Claims, 12 Drawing Sheets

MOTOR-DRIVING CIRCUIT

BACKGROUND OF THE INVENTION

1. Field of the Invention

The present invention relates to a driving circuit of a motor.

2. Description of Related Art

A system of speed control feedback has been generally used as a driving circuit for driving a brushless motor at high speeds. This system of speed control feedback is a kind of feedback system which compares a speed command value with an actual detected value using a control amplifier and which controls a motor (brushless motor) to be controlled so as to eliminate an error between them.

In this respect, the speed of the brushless motor can be detected based on the output of a Hall effect sensor for detecting the polarity of the field magnet of a rotor mounted on the brushless motor.

In general, the brushless motor is widely used when a constant speed is required and, when high speeds and low speeds are required, a brush motor is used because it is easily driven at variable speeds. In other words, a problem is produced that, when the above-described brushless motor is controlled by using a speed control feedback system based on the output of the Hall effect sensor and the brushless motor is driven at low speeds, because the output of Hall effect sensor has a small amount of information, a response to the feedback is reduced to make the rotation unstable and to reduce the rotation because of a variation in load. In order to solve this problem, the brushless motor can be provided with an encoder for detecting the position of rotation, in addition to the Hall effect sensor for detecting the polarity of the field magnet, to increase the amount of information relating to the speed control, but the cost of the brushless motor is greatly increased if the brushless motor is provided with an expensive encoder only for speed control.

The driving circuit of a three-phase brushless motor relating to a related art will be described with reference to FIG. 12.

The above-described driving circuit is constituted by providing six driving elements comprising field effect transistors FET41 to FET46 with switches SW1 to SW6. In this respect, when a current is passed to a U-phase—a V-phase, the FET41 is turned on by the SW1 and the FET44 is turned by the switch SW4. At the same time, when a current is passed to a V-phase—a W-phase, the FET43 is turned on by the SW3 and the FET46 is turned by the SW6. Further, when a current is passed to a W-phase—a U-phase, the FET45 is turned on by the SW5 and the FET42 is turned by the SW2.

In this respect, as shown in FIG. 12, the switches SW1 to SW6 (comprising transistors or the like, for example) for turning-on/off the FET41 to FET46 needs power circuits V1 to V6, respectively. In this respect, since the switches SW2, SW4 and SW6 for turning-on/off the lower side FET42, FET44 and FET46 are connected to the ground, the power sources V2, V4 and V6 can be shared but four power circuits are required.

In addition, six semiconductor switches are required for exciting three phases of U, V and W and the switches SW1 to SW6 (comprising transistors or the like, for example) for driving these six semiconductor switches need to be provided with a control signal, respectively: that is, a circuit for producing the control signals for three phases of U, V and W.

The present invention is made to solve the above-described problems. It is an object of the present invention to provide a driving circuit which can drive the brushless motor in a wide range of rotation.

It is another object of the present invention to provide a motor driving circuit for controlling an FET by a single power source.

It is further another object of the present invention to provide a motor driving circuit which can restart a motor quickly after an electric power supply is stopped for a long time.

It is still further another object of the present invention to provide a driving circuit for a three-phase brushless motor which can drive a motor in a wide range of rotation with a simple constitution.

SUMMARY OF THE INVENTION

To solve the above-described objects, in accordance with one aspect of the technical features of the present invention, there is provided a driving circuit for a three-phase brushless motor comprising a rotor having a field magnet, a stator having a first phase coil, a second phase coil and a third phase coil for rotating the rotor, and a Hall effect sensor for detecting the positions of magnetic poles corresponding to the first phase coil, the second phase coil and the third phase coil, wherein, when the brushless motor is rotated at low speeds, it is driven by exciting the first phase coil, the second phase coil and the third phase coil by a sine-wave (sinusoidal) PWM system having a phase difference of 120° from each other and wherein, when the brushless motor is rotated at high speeds, it is driven by a square-wave PWM signal based on a three-phase 120° conduction type.

In the present invention, when the brushless motor is rotated at low speeds (less than a predetermined number of revolutions), it is driven by a sine wave (sinusoidal) PWM system and, when the brushless motor is rotated at high speeds (not less than a predetermined number of revolutions), it is driven by a square wave PWM system, whereby the brushless motor can be driven smoothly without much pulsating torque over the full range of revolutions from a low speed (zero revolution) to high speeds (several tens of thousands of revolutions).

In the preferred embodiment of the present invention, when the brushless motor is rotated at low speeds, at least one phase difference between the positions of magnetic poles detected by the Hall effect sensor and the exciting voltage waveforms of the coils of the first phase, the second phase and the third phases is detected to perform a torque control, whereby the brushless motor can be driven stably even in the range of low speeds.

In the preferred embodiment of the present invention, when the brushless motor is rotated at high speeds, the number of revolutions is detected by the signal of the Hall effect sensor to perform a speed control and a multiplying ratio or a dividing ratio of the signal of the Hall effect sensor is switched in response to the number of revolutions, whereby the brushless motor can be driven stably at high speeds without deteriorating the accuracy of detecting the number of revolutions.

Pursuant to another aspect of the technical features of the present invention, there is provided a driving circuit for a single-phase or a multi-phase motor comprising upper side MOSFETs (hereinafter referred to as "FET") connected to a high electric potential side, an upper side control circuit for turning on/off the upper side FETs, lower side FETs connected to the earth or a minus electric potential, a lower side control circuit for turning on/off the lower side FETs and condensers disposed in series to the lower side FETs and in parallel to the power source of the upper side control circuit, wherein the upper side FETs are connected in series to the lower side FETs to form bridge circuits, wherein the upper side FETs and the lower side FETs are switched by a pulse width modulation control (hereinafter referred to as "PWM control"), wherein, when the lower side FETs are turned on by the lower side control circuit, the condensers are charged and the upper side FETs are turned on by the upper side control circuit by using the charges charged in the condensers to drive the driving circuit for a single-phase or a multi-phase motor by a single power source, and wherein, when a power supply is stopped, the upper side FETs are turned off by the upper side control circuit and the lower side FETs are turned on by the lower side control circuit to charge the condensers.

In the present invention, when the lower side FETs are turned on by the lower side control circuit, the condensers connected in series to the lower side FETs are charged and the upper side FETs are turned on by the upper side control circuit by using the charges charged in the condensers, whereby the upper side and lower side FETs of the driving circuit for a single-phase or a multi-phase motor can be controlled by a single power source.

Further, when a power supply is stopped, the upper side FETs are turned off by the upper side control circuit and the lower side FETs are turned on by the lower side control circuit to charge the condensers and the upper side FETs are turned on by the upper side control circuit by using the charges charged in the condensers, whereby the motor can be quickly restarted even after the power supply is stopped for a long time.

In the preferred embodiment, the driving circuit for the motor detects the rotation state and the stop state of the motor and, when the motor is stopped for a time of not less than a predetermined time, the condensers are charged until the next rotation command is given and the motor is short-circuited and braked.

In the preferred embodiment, the upper side control circuit and the lower side control circuit comprise photo-couplers and an input and an output are separated by the photo-couplers to prevent a malfunction caused by noises from an input line.

Pursuant to still another aspect of the technical features of the present invention, there is provided a driving circuit for a three-phase brushless motor comprising a rotor having a filed magnet, radial air bearings for rotatably supporting the rotor, and a stator comprising a first phase coil, a second phase coil and a third phase coil which are disposed on the outer peripheral surfaces of the radial air bearings and rotate the rotor, wherein, when the brushless motor is rotated at low speeds, two-phase sine wave PWM exciting signals having a phase difference of 60° are given to the coils and wherein, when the brushless motor is rotated at high speeds, two-phase square wave PWM exciting signals having a phase difference of 60° are given to the coils.

In the present invention, when the brushless motor is rotated at low speeds, a low speed exciting circuit gives it two-phase sine wave PWM exciting signals having a phase difference of 60°. Moreover, when the brushless motor is rotated at high speeds, a high speed exciting circuit gives it two-phase square wave PWM exciting signals having a phase difference of 60°. In this respect, the brushless motor provided with a low speed exciting means for driving the brushless motor at low speeds and a high speed exciting means for driving the brushless motor at high speeds can be simply constituted by generating a rotating magnetic field by two-phase to drive the brushless motor. Therefore, a three-phase brushless motor for a dental surgery machine can be driven at high speeds and ultra-low speeds by a simple constitution.

BRIEF DESCRIPTION OF THE INVENTION

Figure 8A:
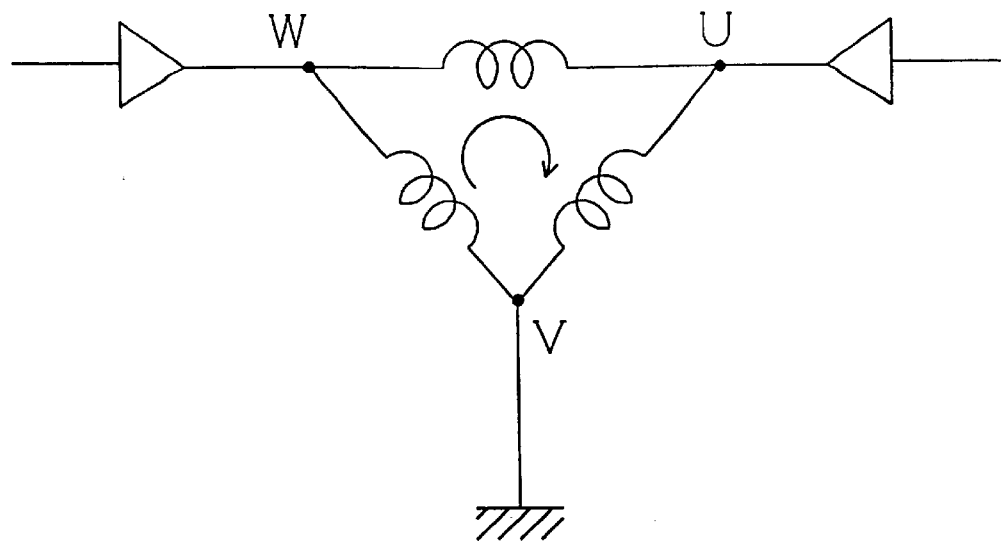
Figure 8B:
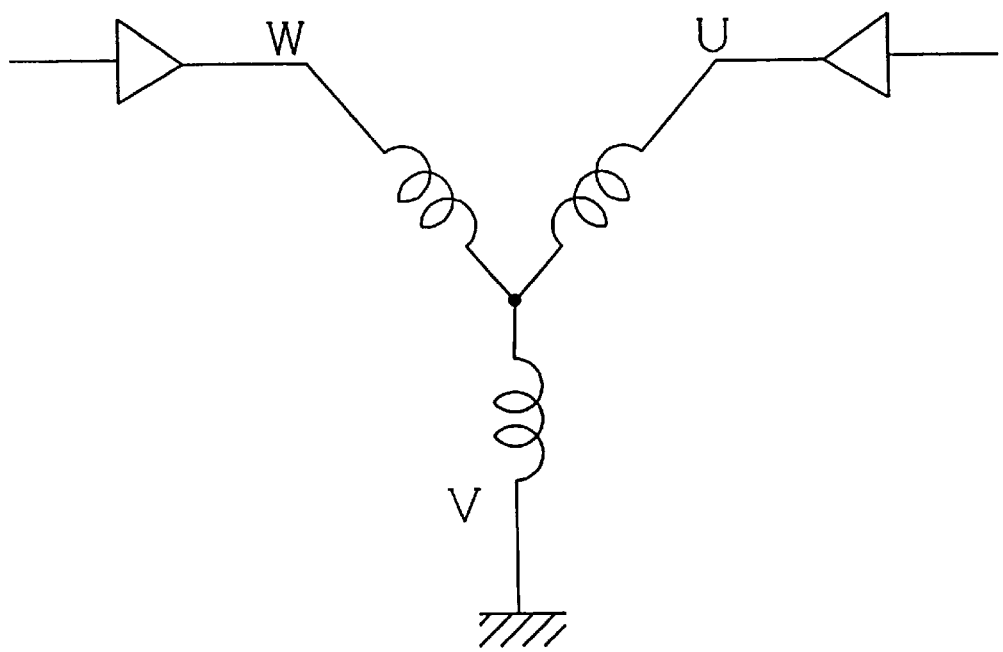

FIG. 8(A) and FIG. 8(B) illustrate a connection of a brushless motor relating to the second preferred embodiment of the present invention.

Figure 9:
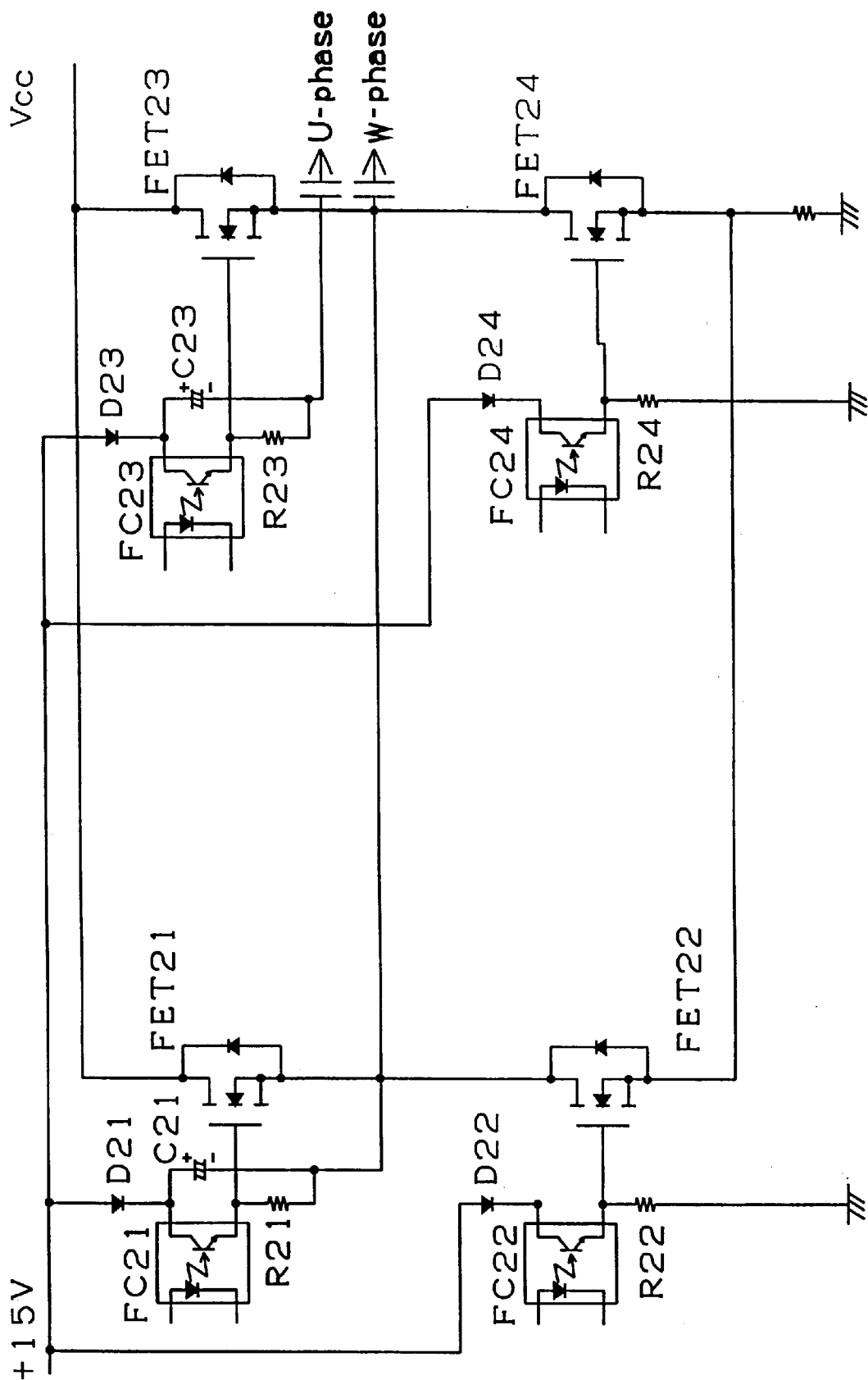

FIG. 9 is a circuit of a power circuit for driving two phases relating to the second preferred embodiment.

Figure 2:
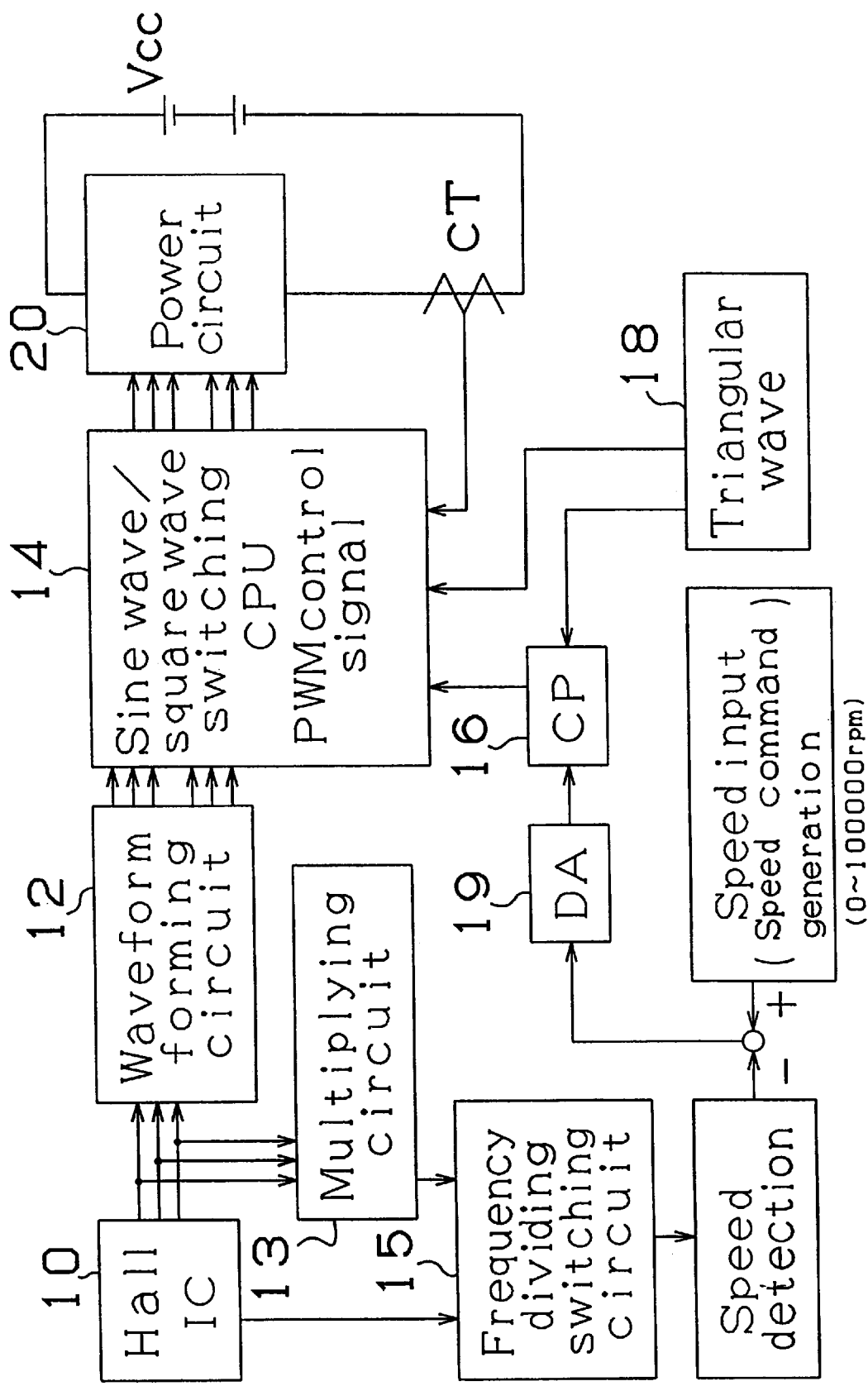
FIG. 2 is a block diagram of a driving circuit of a brushless motor relating to the first preferred embodiment of the present invention.
Figure 10:
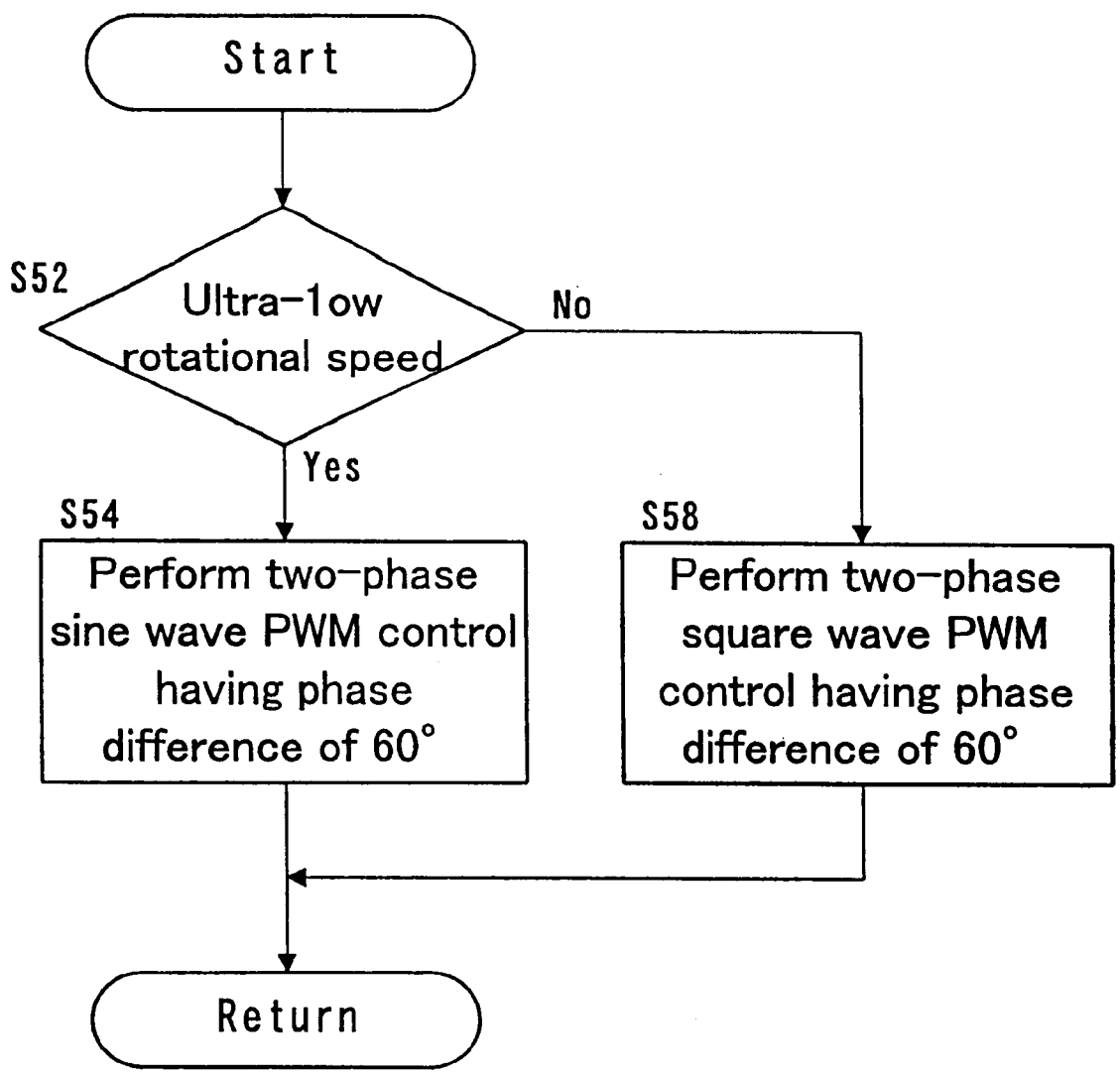

FIG. 10 is a flow chart showing a control switching processing of a driving circuit of the second preferred embodiment at high speeds and low speeds by a CPU shown in FIG. 2.

Figure 11:
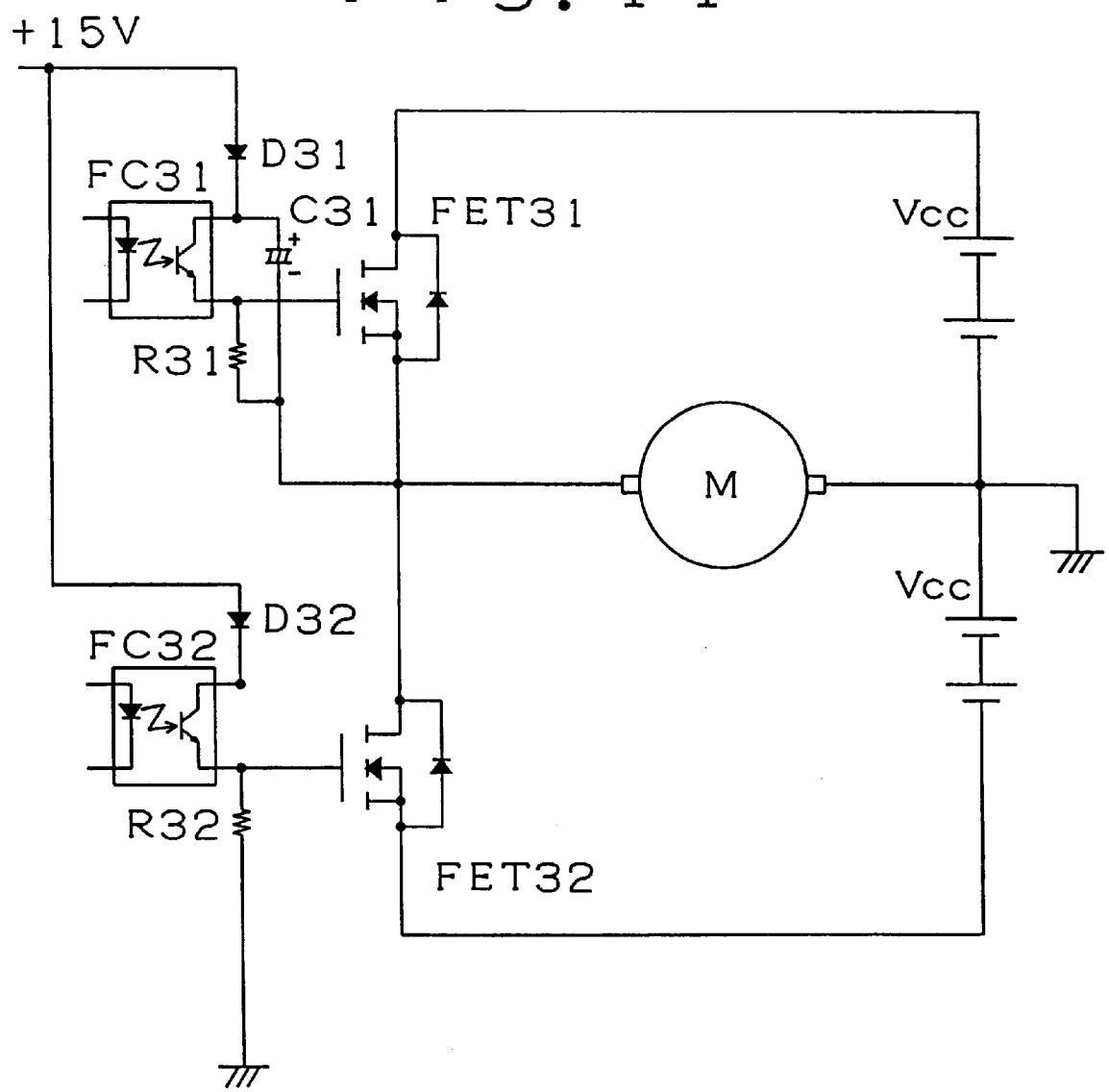

FIG. 11 is a circuit of a power circuit of a single phase relating to the third preferred embodiment.

Figure 12:
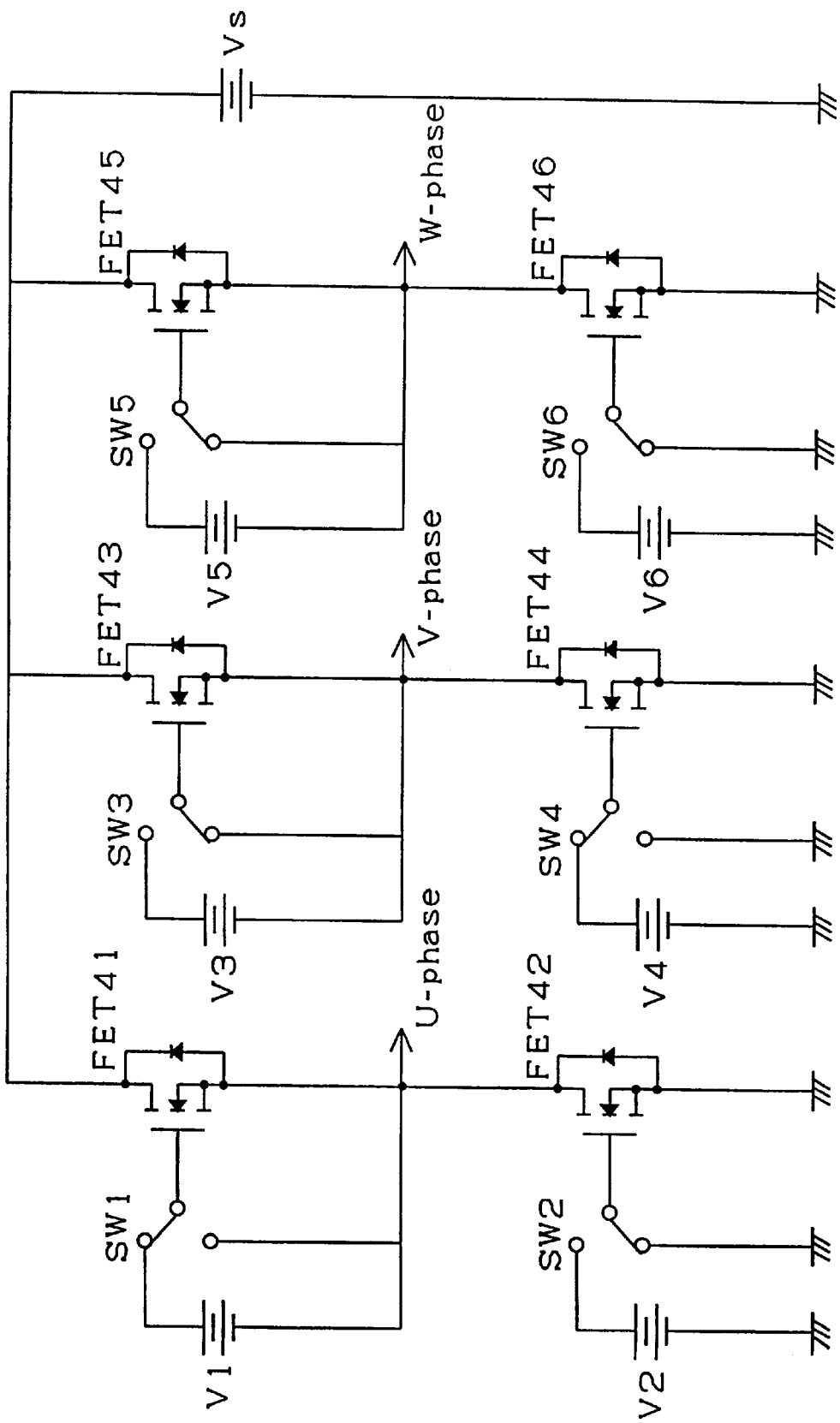

FIG. 12 is a circuit of a power circuit relating to a related art.

DESCRIPTION OF THE PREFERRED EMBODIMENTS

Figure 1:
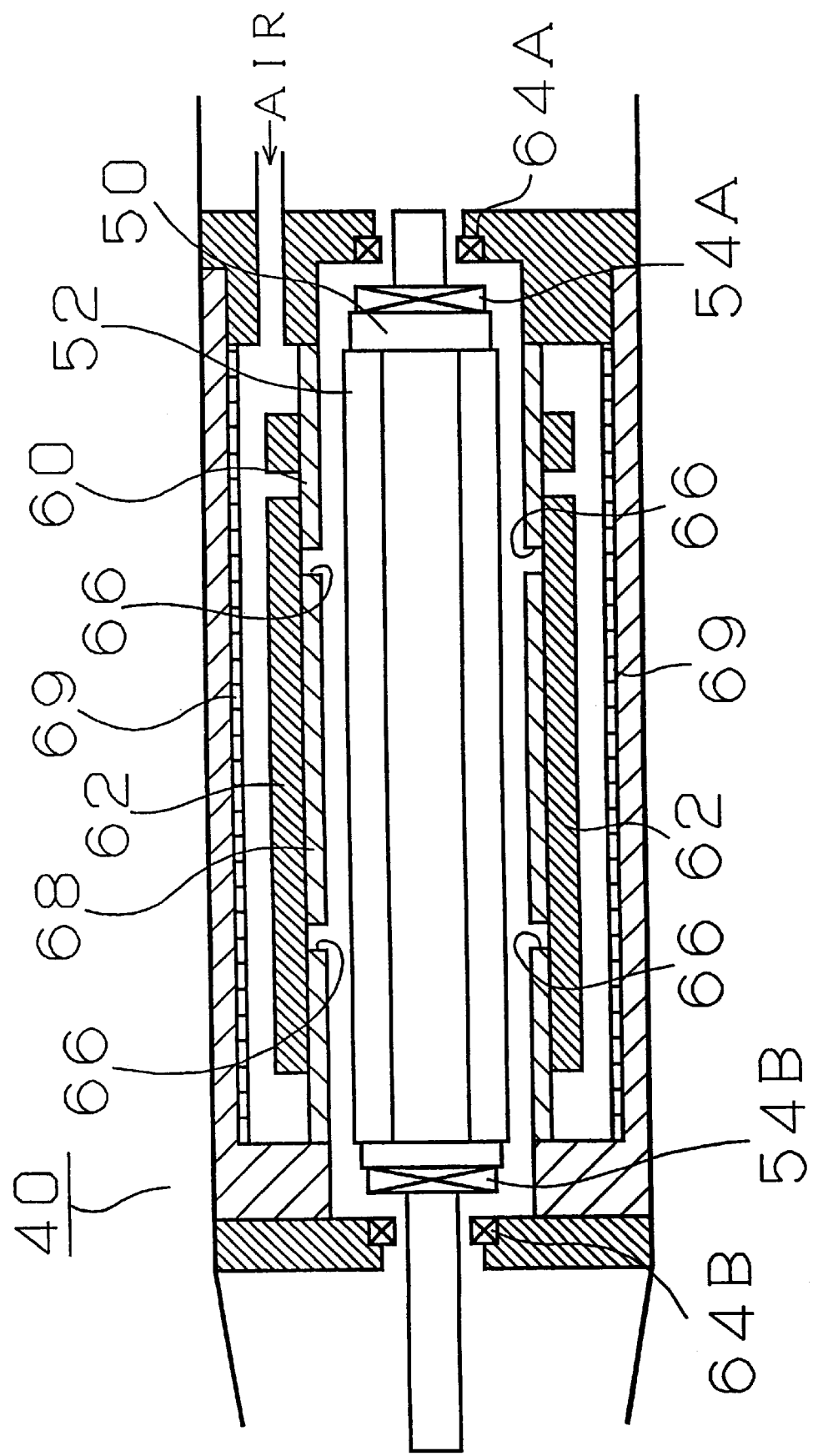
FIG. 1 is a cross sectional view showing the constitution of a brushless motor relating to the first preferred embodiment of the present invention.

The preferred embodiments of a circuit for driving a brushless motor according to the present invention will be hereinafter described with reference to the drawings. FIG. 1 shows a mechanical constitution of a brushless motor for a machine used for the dental treatment of the first preferred embodiment. The above-described brushless motor 40 is driven at a rotational speed of 40,000 revolutions/min when a tooth is ground and at an extremely low rotational speed of 100 revolutions/min, when a tooth root is treated.

A stator 60 composed of a ceramic sleeve is provided on the outer periphery of a rotor 50 composed of a ceramic sleeve and air is supplied to the stator 60 and is discharged from a through hole 66 to form a radial hydrostatic bearing. A field magnet 52 with four poles is arranged on the outer periphery of the rotor 50. Moreover, three sets of coils 62 are provided on the outer periphery of the stator 60. Further, a yoke 69 is provided outside the coil 62. Magnets 54A and 54B are mounted on the right end and the left end of the rotor 50 in the drawing to regulate the movement in the direction of thrust of the rotor 50 by the repulsive forces thereof to the magnets 64A and 64B mounted on the stator 60 side. Still further, the brushless motor is provided with a Hall effect sensor not shown for detecting the polarity of the field magnet 52.

FIG. 2 shows a brushless driving circuit relating to the first preferred embodiment. The brushless driving circuit is provided with a wave form forming circuit 12 for generating a driving signal by a signal from the Hall effect sensor (Hall IC) 10 for detecting the polarity of the above-described field magnet 52, a triangular wave generating circuit 18 for generating a triangular wave, a D/A conversion circuit 19 for generating a DA signal produced by converting the rotational speed of the brushless motor which is detected by the signal of the pole sensor into a voltage value, a multiplying circuit 13 for multiplying the signal from the Hall effect sensor, a dividing/multiplying switching circuit 15 for dividing the signal from the Hall effect sensor or multiplying the signal, and a comparator 16 for sending a square wave PWM output for controlling the brushless motor by a system of square wave PWM when the brushless motor is rotated at high speeds.

The comparator 16 compares the DA signal produced by converting the rotational speed of the brushless motor detected by the signal from the Hall IC into a voltage value with a triangular wave from the triangular wave generating circuit 18 and sends a PWM output.

A CPU 14 generates a driving signal of a power circuit 20 based on the signal of the Hall effect sensor 10 from a filter 12 and the PWM output from the comparator 16, or based on the load current detected by a CT.

The circuit constitution of the power circuit 20 shown in FIG. 2 will be described with reference to FIG. 3.

A photo-coupler power circuit 20 is constituted as a bridge circuit composed of three upper side FET1, FET3 and FET5 connected to a power source Vcc side and three lower side FET2, FET4 and FET6 connected to an earth side. Six photo-couplers FC1 to FC6 are connected to the upper side and lower side FET1 to FET6 so as to turn on/off them.

The input of the photo-coupler FC1 for turning-on/off the upper side FET1 is connected to an FET control voltage line of +15 V via a diode D1 and the output side of the photo-coupler FC1 is connected to the gate side of the FET1. A resistor R1 is connected to the photo-coupler FC1 in series. The lower side FET2 is connected to the photo-coupler FC1, the resistor R1, and a condenser C1 in series.

The input of the photo-coupler FC2 for turning-on/off the lower side FET2 is connected to the FET control voltage line of +15 V via a diode D2 and the output side of the photo-coupler FC2 is connected to the gate side of the FET2 and is connected to the earth via a resistor R2. In this respect, the upper side FET1 is connected to the lower side FET2 in series and a current is impressed on the stator coil 62 (U phase) of the above-described brushless motor from the connection point of the FET1 and the FET2 (see FIG. 1).

Figure 3:
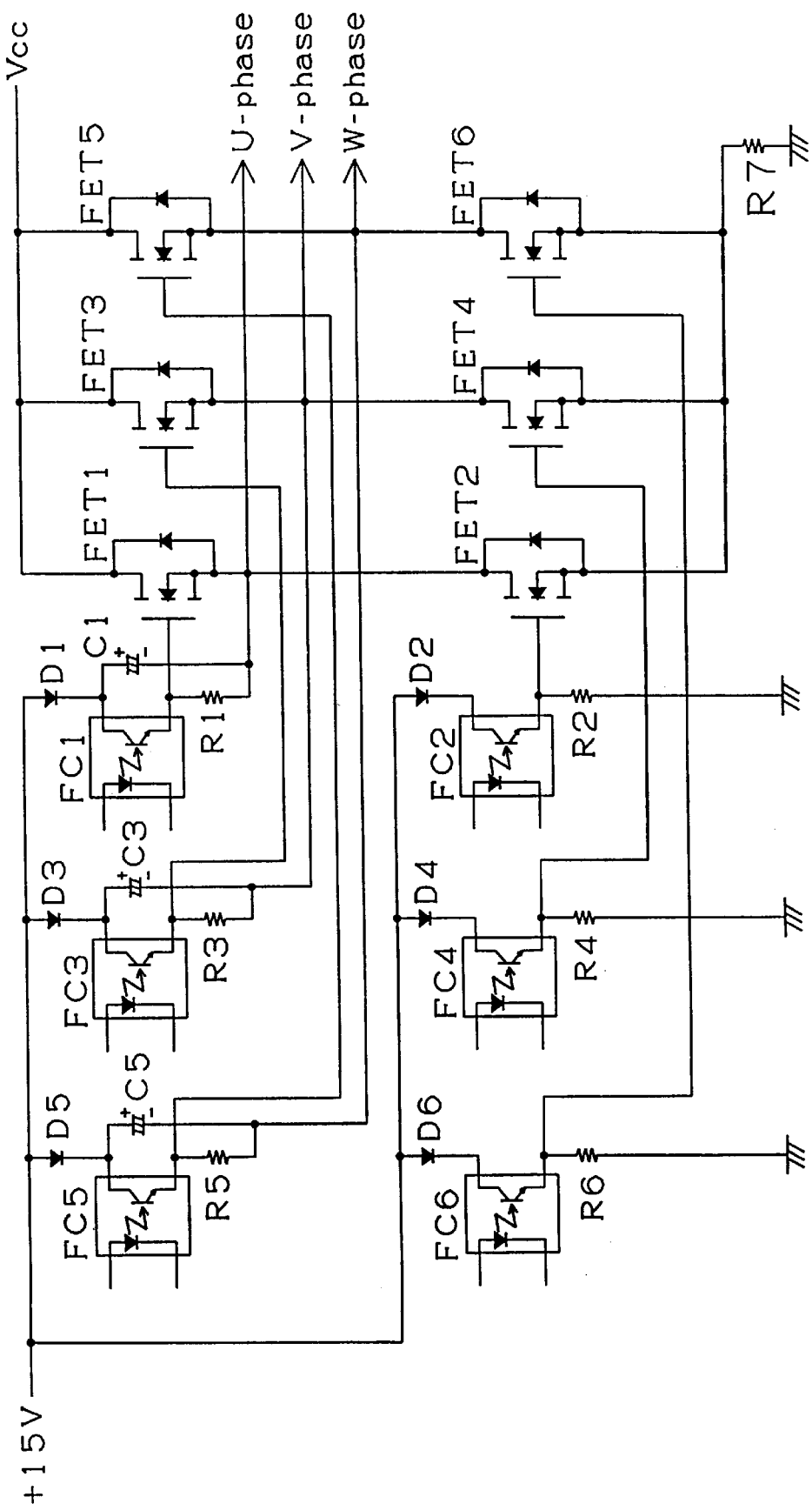
FIG. 3 is a circuit diagram of a power circuit shown in FIG. 2.
Figure 6:
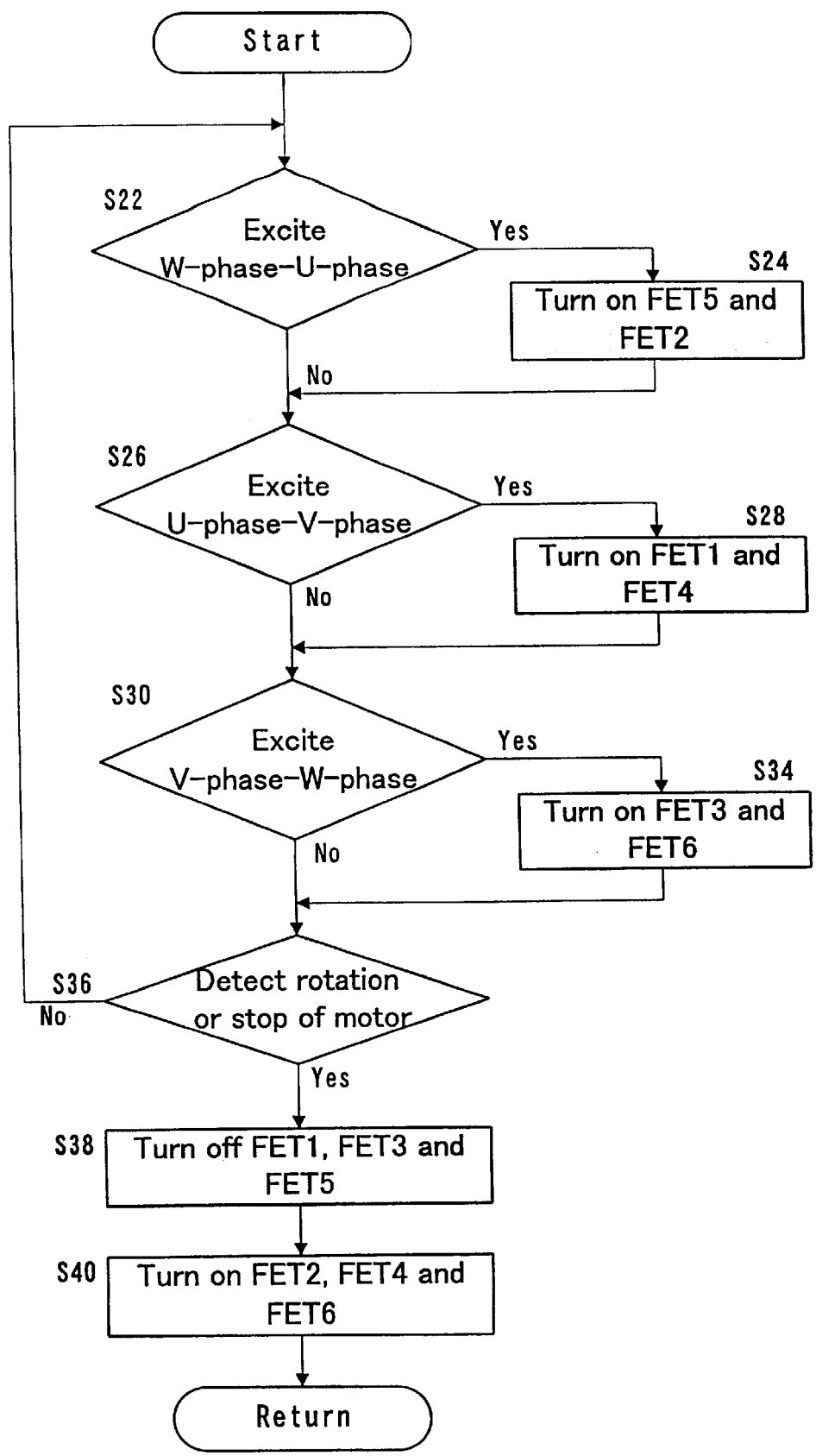
FIG. 6 is a flow chart showing a control switching processing of an exciting phase by a CPU shown in FIG. 2.

FIG. 3 and a flow chart in FIG. 6 showing the processing of the CPU 14 for driving the power circuit will be described for the motion of the photo-coupler power circuit 20. In this respect, when a current is passed through the W-phase—the U-phase of the stator coil (the answer of a step S22 is YES), the photo-couplers FC5 and FC2 shown in FIG. 2 are turned on by the signal of the CPU 14 shown in FIG. 2 and the upper side FET5 is turned on by the photo-coupler FC5 and the lower side FET2 is turned on by the photo-coupler FC2 (S24) to impress the power source voltage Vcc on the W-phase—the U-phase of the stator coil. In other words, a current is passed through Vcc—FET5—W phase and U phase of the stator coil (not shown)—FET2—resistor 7—the earth in sequence. In this respect, a current from the FET control voltage line of +15 V is passed to the FET 2 side via the diode D1 and a condenser C1 to accumulate charges with a polarity shown in the drawing in the condenser C1.

Next, when a current is passed through the U-phase—V-phase of the stator coil (the answer of a step S26 is YES), photo-couplers FC1 and FC4 are turned on by the signal of the CPU 14. Then, when the photo-coupler FC1 is turned on, the charges charged in the condenser C1 when the above-described FET2 is turned on are impressed on the gate of the FET1 through the photo-coupler FC1 to turn on the FET1. On the other hand, a current from the FET control voltage line of +15 V is passed to the earth side via a diode D4, the photo-coupler FC4 and a resistor R4 to apply electric potential divided by the resistor R4 to the gate side of the FET4, thereby turning on the FET4 (S28). A power source voltage Vcc is impressed on a coil of the U-phase—the V-phase when the FET1 and the FET4 are turned on. Moreover, when the FET4 is turned on, the condenser C3 is charged to the polarity shown in the drawing.

When a current is passed through the V-phase—the W-phase of the stator coil (the answer of a step S30 is YES), the photo-couplers FC3 and FC6 are turned on. In this respect, when the photo-coupler FC3 is turned on, the FET3 is turned on by the charges charged in the condenser C3. On the other hand, when the photo-coupler FC6 is turned on, the FET 6 is turned on (S34). When the FET3 and the FET6 are turned on, the power source voltage Vcc is impressed on the coil of the U-phase—the W-phase. Moreover, when the FET6 is turned on, the condenser C5 is charged to the polarity shown in the drawing. When the above-described W-phase is excited, the upper side FET5 is turned on by the charges.

As described above, the lower side FET2, FET4 and FET6 are turned on by the lower side photo-couplers FC2, FC4 and FC6, the condensers C1, C3 and C5 connected to the lower side FET2, FET4 and FET6 in series are charged and the upper side FET1, FET3 and FET5 are turned on in sequence by the upper side photo-couplers FC1, FC3 and FC5 using the charged charges, whereby the upper side and lower side FET1 to FET 6 of a three-phase power conversion circuit can be controlled by a single power source (FET control voltage of +15 V).

Next, the motion when the power conversion circuit stops the brushless motor will be described. The CPU 14 shown in FIG. 1 monitors the signal from the Hall IC 10. In this respect, when the CPU 14 detects that the signal from the Hall IC 10 is not changed for not less than a predetermined time, in other words, that the brushless motor is stopped (the answer of a step S36 is YES), all of the upper side photo-couplers FC1, FC3 and FC5 of the photo-coupler power circuit 20 shown in FIG. 2 are turned off (S38) and all of the lower side photo-couplers FC2, FC4 and FC6 thereof are turned on (S40) to short-circuit and brake the motor, that is, to switch to a charging sequence, whereby all of the condensers C1, C3 and C5 connected to the FET2, FET4 and FET 6 in series are charged.

Then, when the brushless motor is restarted, any of the upper side and lower side photo-couplers is turned on so as to excite any of the above-described U-phase, V-phase, and W-phase. In this respect, in this preferred embodiment, since all of the condensers C1, C3 and C5 for turning on the upper side FET1, FET3 and FET5 are kept in the charged state while the brushless motor is stopped, when the photo-couplers are turned on, the upper side FET1, FET3 and FET5 can be quickly made in a conduction state.

In other words, in a constitution shown in FIG. 3, when the brushless motor is stopped, if the upper side FET1, FET3 and FET5 are not turned off and the lower side FET2, FET4 and FET6 are changed into a conduction state, the charges charged in the condensers C1, C3 and C5 are gradually discharged. After the brushless motor is stopped for a long time, even if the photo-couplers FC1, FC3 and FC5 which are separated from the earth are turned on, the FET1, FET3 and FET5 cannot be turned on, as long as the voltage is not impressed on them by the condensers C1, C3 and C5. On the other hand, in the power conversion circuit of the first preferred embodiment, if all of the condensers C1, C3 and C5 are charged while the brushless motor is stopped, the upper side FET1, FET3 and FET5 can be turned on by the charges charged in the condensers and hence the brushless motor can be quickly restarted even after it is stopped for a long time.

In this respect, only the condenser for the upper side FET for passing a current through a coil to be first excited when the brushless motor is restarted can be charged. For example, when the U-phase is first excited, it is recommended that only the condenser C1 for driving the upper side FET1 is charged. On the other hand, in this preferred embodiment, all of the lower side FET2, FET4 and FET6 are turned on to charge all of the condensers C1, C3 and C5 for driving the upper side FETs while the brushless motor is stopped. Therefore, since it is not necessary to specify the FET for passing a current through a coil to be first excited and to charge condensers gradually after the brushless motor is started because all of the condensers C1, C3 and C5 are previously charged, all of the upper side FET1, FET3 and FET5 can be smoothly turned on when the brushless motor is started.

In this respect, in this preferred embodiment, the condensers continues to be charged while the brushless motor is stopped but it is also possible that, just before the brushless motor is started, the condensers are charged and then a current starts to be passed through the coil.

Moreover, in this preferred embodiment, the elements for controlling the upper side and lower side FETs are composed of the photo-couplers FC1 to FC6. Since an input and an output are separated by the photo-coupler, even if noises generated in the brushless motor or a driving circuit for the brushless motor are superimposed on the input line side, a malfunction does not occur.

Next, a modification of a photo-coupler circuit of a motor driving circuit relating to the first preferred embodiment shown in FIG. 3 will be described with reference to FIG. 7.

Figure 7:
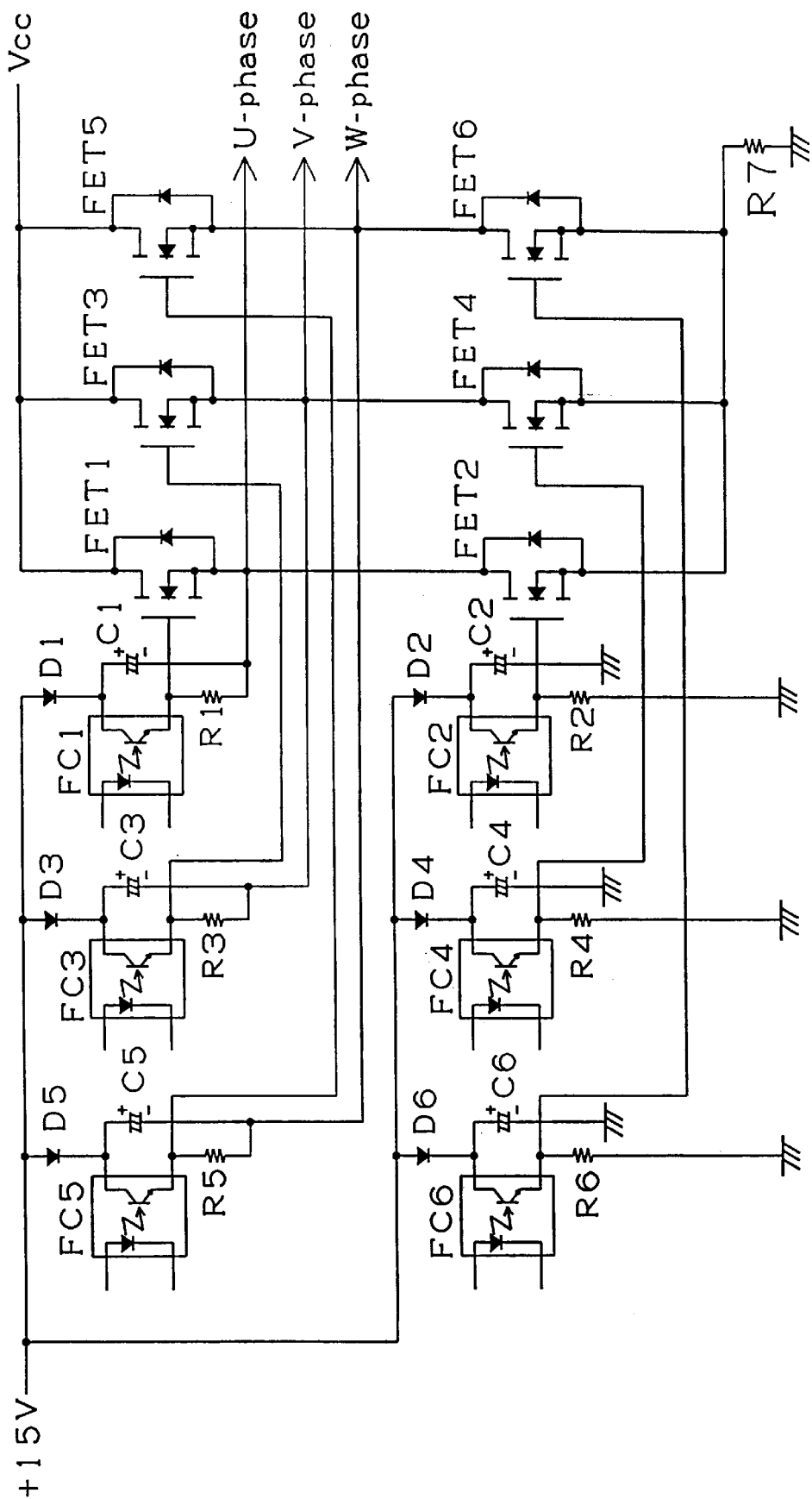
FIG. 7 is a circuit of a power circuit related to a modification of the first preferred embodiment.

In this circuit constitution relating to the modification shown in FIG. 7, the condensers C2, C4 and C6 are connected to the lower side photo-couplers FC2, FC4 and FC6 in parallel. In the circuit constitution relating to this modification, when the lower side FET2, FET4 and FET6 are turned on, the charges of the condensers C2, C4 and C6 which are connected to the lower side photo-couplers FC2, FC4 and FC6 are impressed on the lower side FET2, FET4 and FET6, whereby the lower side FETs can be smoothly switched to a conduction state.

Figure 5:
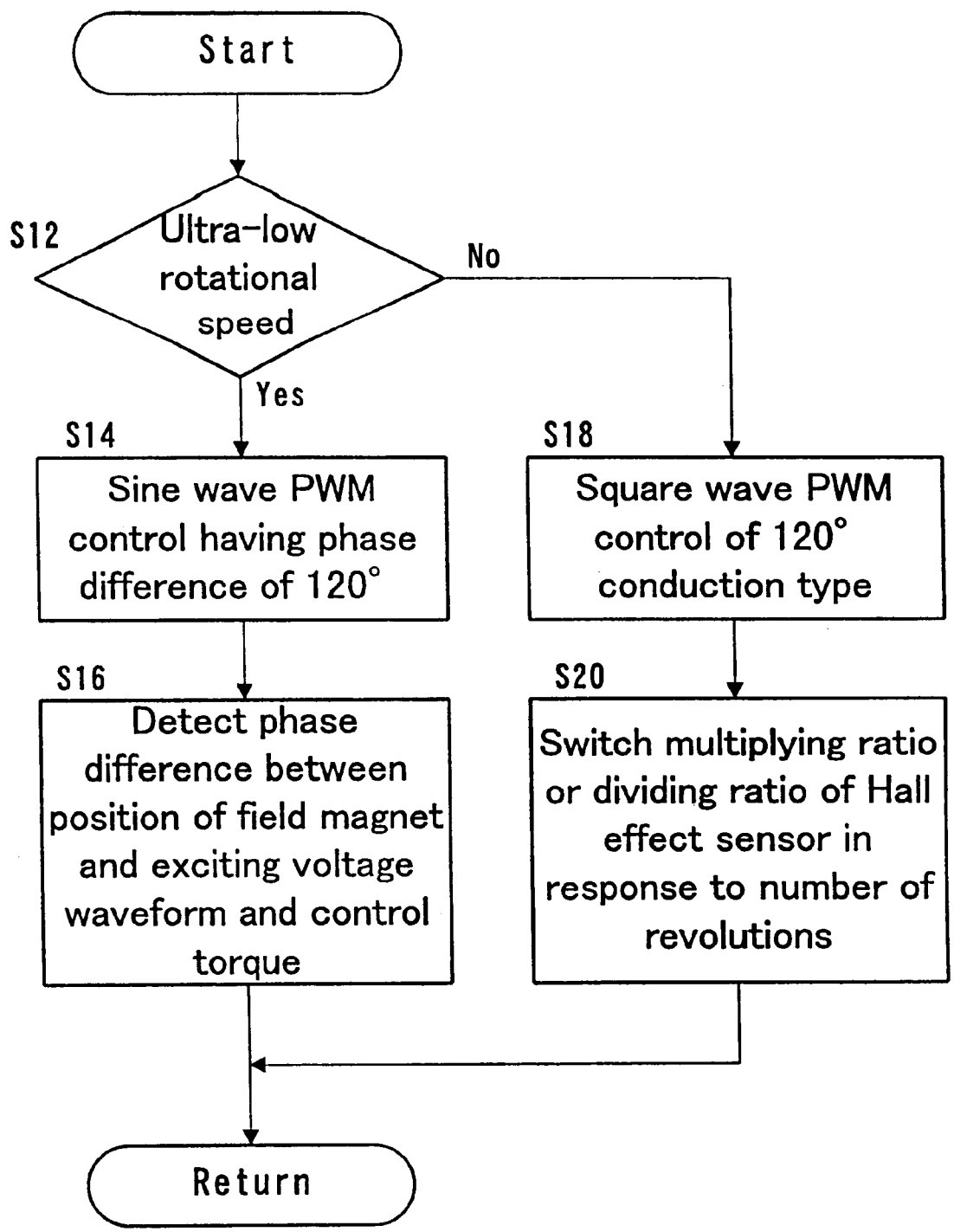
FIG. 5 is a flow chart showing a control switching processing at high speeds and low speeds by a CPU shown in FIG. 2.

In the motor driving circuit of the first preferred embodiment, the CPU 14 switches the control system of the brushless motor from a low speed system (sine wave PWM system) to a high speed system (square wave PWM system). In regard to the switching system, the flow chart of processing by the CPU 14 will be described with reference to FIG. 5.

First, a control of a driving circuit when the brushless motor is rotated at a high rotational speed (40,000 revolutions/min) (the answer of a step S12 is NO) will be described (S18, S20).

The driving circuit for the brushless motor detects a rotational speed by the signal from the Hall effect sensor 10 and executes a speed feedback control in the range of high rotational speeds, that is, when a motor speed exceeds the number of revolutions set within the range of 1,000 to 5,000 revolutions/min. (for example, 2,000 revolution/min.) set by a command speed. In this respect, a current is impressed on the coil by use of square wave PWM system based on three-phase 120° conduction type. A 180° conduction type with slightly lower efficiency can also be used instead of the 120° conduction type.

Figure 4:
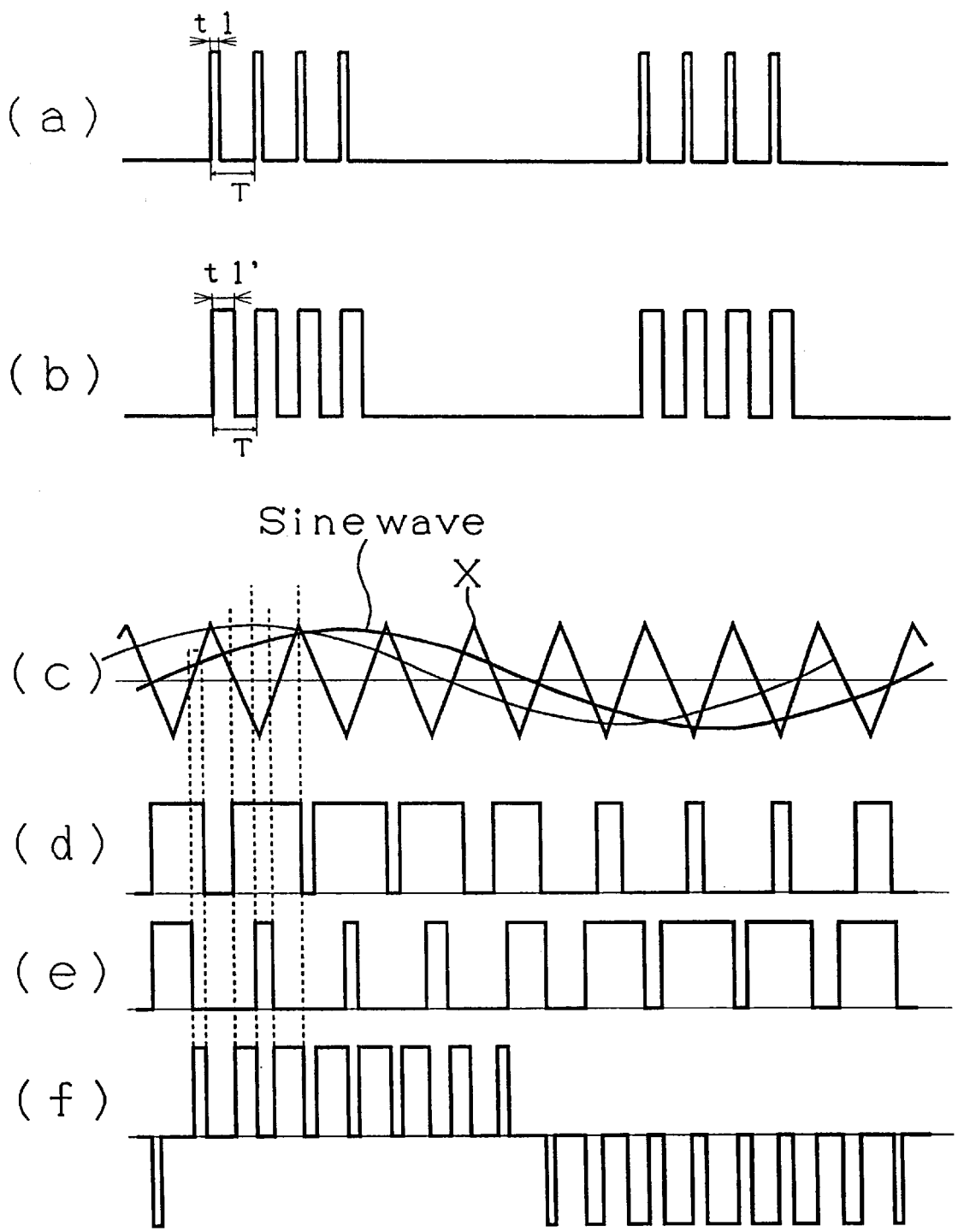
FIG. 4 is a wave diagram showing a signal for the sine wave pulse width modulation (PWM) control and a signal for a square wave PWM control of a power circuit shown in FIG. 2.

The Hall effect sensor 10 detects the polarity of the field magnet 52 mounted on the rotor 50 of the brushless motor and outputs the signal thereof. A D/A conversion circuit 19 converts the rotational speed of the brushless motor detected by the signal into a voltage value to produce a D/A signal. A comparator 16 compares the D/A signal with a triangular wave from a triangular wave generating circuit 18 to produce a square wave PWM signal shown in FIG. 4(a) and (b). The square wave PWM signal outputs a square wave having a short wave width tl and a period of T (20 KHz), as shown in FIG. 4(a), when an actual speed equals to a target speed, and a square wave having a long wave width tl' and a period of T (20 KHz), as shown in FIG. 4(b), when the actual speed is lower than the target speed.

The CPU 14 produces a timing when a current is passed through a coil 62 based on the signal of the Hall effect sensor (Hall IC) 10 from a filter 12 by use of a 120° conduction type and produces a driving signal for a power circuit 20 based on the PWM output from the comparator 16. When the brushless motor is rotated at high speeds, the number of revolutions is directly detected and is fed back, which can realize a rotational speed with accuracy.

In this respect, in the range of high rotational speeds, the number of revolutions is detected and controlled by the signal of the Hall effect sensor and the detection accuracy of the number of revolutions is increased by switching the multiplying ratio of the signal of the above-described Hall effect sensor by a multiplying circuit 13 shown in FIG. 2, or by switching the frequency dividing ratio thereof by using a frequency dividing switching circuit 15 (S20) in response to the number of revolutions. To be more specific, since the signal of the Hall effect sensor is input as a signal of "high" —"low" and the CPU calculates the number of revolutions from the "high" period, the signal is multiplied by three when the number of revolutions is lower than the specified number of revolutions and is divided by two or four when the number of revolutions is higher than the specified number of revolutions to increase the detection accuracy of the number of revolutions.

Next, a control of the driving circuit when the brushless motor is rotated at an ultra-low rotational speed (several revolutions/min) (the answer of a step S12 is YES) will be described (S14, S16).

In the driving circuit for the brushless motor, when the brushless motor is rotated at lower speeds of less than the number of revolutions within the range of 1,000 to 5,000 revolution/min set by the command speed, the CPU 14 outputs sine wave PWM signals having a phase difference of 120° from each other to switch the rotation of the brushless motor to a cyclic rotation. In this respect, the above-described square wave PWM system of the speed feedback control at high rotational speeds is switched to the sine wave PWM system of the torque feedback control to control the brushless motor. In other words, a load is detected by a phase difference between a magnetic pole position and a coil exciting voltage waveform (at least equivalent to one of three phases) and the crest value of the PWM system is adjusted in response to the phase difference (load) so that the phase difference does not exceed 60°.

In this respect, it is for the purpose of avoiding a complex control that only one phase is detected in this preferred embodiment. If three phases are detected, a further exact control can be performed because the detection period of the load (control period) is multiplied by three. On the contrary, in order to detect three phases, it is necessary to compensate the variations in magnetization of the field magnets of the motor and the variations in the coils.

In this respect, in the range of low rotational speeds, the CPU 14 detects the load by the phase difference between the magnetic pole position and the coil exciting voltage waveform to excite the coil of the brushless motor so that the phase difference does not exceed 60°. In this respect, as shown in FIG. 4(c), the CPU 14 superimposes two sine waves on a triangular wave to produce a sine wave PWM signal shown in FIG. 4(f). This sine wave PWM signal is constituted by three phases having a phase difference of 120° from each other. In the first preferred embodiment, a load is detected and a feedback control is performed and a current is passed in response to the load to control torque. In other words, the crest value of the sine wave is controlled in response to the torque greatly changed by the load and hence an out-of-phase phenomenon which is apt to occur in a periodic rotation can be previously prevented. Moreover, if the square PWM signal is impressed in the range of low rotational speeds, the brushless motor is rotated intermittently but the sine wave PWM signal is impressed in the present preferred embodiment, thereby smoothly rotating the brushless motor.

Moreover, a low speed control is switched to a high speed control or a high speed control is switched to a low speed control smoothly with no vibration by synchronizing a switching timing with the 60° (electric angle) step of the square wave driving signal. This is because, since a different control system is used for a low rotational speed and a high rotational speed, if the low speed control is switched to the high speed control or the high speed control is switched to the low speed control at an arbitrary timing, a current is discontinuously changed to produce a vibration.

As described above, in the driving circuit of the first preferred embodiment, the number of revolutions is detected based on the output of the Hall effect sensor for detecting the polarity of the field magnet when the brushless motor is controlled at high speeds and hence a speed feedback control can be performed with no element for detecting the number of revolutions. On the other hand, when the brushless motor is controlled at low speeds, the output of the Hall effect sensor is not sufficient in the amount of information to detect the number of revolutions and to perform a feedback control. Therefore, when the brushless motor is rotated at low speeds, it is periodically rotated by the sine wave signal and a torque feedback control is performed based on the load current, which makes the rotation of the brushless motor stable.

Furthermore, when the brushless motor is rotated at low speeds (less than a set number of revolutions from 1,000 to 5,000 revolutions/min), it is driven by the sine wave PWM system and, when the brushless motor is rotated at high speeds (not less than a set number of revolutions from 1,000 to 5,000 revolutions/min), it is driven by the square wave PWM system, whereby the brushless motor can be driven stably at low speeds and high speeds.

In this respect, the reason why the speed control of the brushless motor is switched from the sine wave system to the square wave system when the rotational speed is high as described above in the first preferred embodiment is that it is difficult to form a sine wave as the frequency is increased if the frequency of PWM is fixed (for example, 20 KHz). Moreover, it is because, since the speed control is not performed when the brushless motor is driven by the sine wave at ultra-low speeds, the brushless motor is rotated synchronously by the frequency of the sine wave and is apt to be out of phase as the frequency is increased.

The preferred embodiment of the driving circuit for the brushless motor relating to the second preferred embodiment of the present invention will be described below with reference to FIG. 8 and FIG. 9. In the second preferred embodiment, the brushless motor composed of three phases of U, V and W is excited by two phases U and W. The rotational principle of this brushless motor will be described with reference to FIG. 8 before describing the second preferred embodiment.

The rotating magnetic field of the three phases U, V and W can be generated in the coil of the brushless motor by impressing the following signals.

$$U = \alpha \sin \overline{\omega} t$$

$$V = \alpha \sin (\overline{\omega} t - 120°)$$

$$W = \alpha \sin (\overline{\omega} t - 240°)$$

However, in a connection shown in FIG. 8(A), a rotating magnetic field can be generated by inputting a signal having a shifted phase into the U-phase and the W-phase.

If the phase is turned in the order of U-V-W, the following equation can be obtained.

$$\begin{aligned} U - V &= \alpha \sin \varpi t - \alpha \sin(\varpi t - 120°) \\ &= \alpha \cdot 2 \sin 120° \times 1/2 \cos 1/2 \ (2\varpi t - 120°) \\ &= \alpha \cdot 2 \sin 60° \times \cos(\varpi t - 60°) \\ &= \alpha(\sqrt{3}) \cos(\varpi t - 60°) \end{aligned}$$

Similarly, the following equations can be obtained.

$$V - W = \alpha(\sqrt{3}) \cos \overline{\omega} t$$

$$W - U = -\alpha(\sqrt{3}) \cos (\overline{\omega} t - 60°)$$

Therefore, as is evident from these equations, it is recommended that a signal having a phase difference of 60° is impressed on the U-phase and the W-phase so as to generate a three-phase rotating magnetic field in the coil shown in FIG. 8(A).

In the other words, if an exciting signal is applied on the U-phase (first phase) and a signal having a phase difference of 60° from the exciting signal of the first phase is applied on the W-phase (second phase) and the V-phase (third phase) is connected to the earth, the first phase, the second phase and the third phase (V-phase) can generate a rotating magnetic field. A motor having a delta-connection is shown in FIG. 8 (A) but, in a motor having a star-connection shown in FIG. 8 (B), a rotating magnetic field can be generated by exciting two phases. Either of the sine wave and the square wave will do for the exciting signal.

Since the constitution of the driving circuit for the brushless motor of the second preferred embodiment is the same as the first preferred embodiment described above with reference to FIG. 2, the description thereof will be omitted. In this respect, since the power circuit of the second preferred embodiment is different from that of the first preferred embodiment, the constitution of the power circuit of the second preferred embodiment will be described with reference to FIG. 9.

The power circuit 20 is constituted as a bridge circuit composed of upper side FET21 and FET23 connected to a power source Vcc side, and lower side FET22 and FET24. Four photo-couplers FC21 to FC24 for turning on the upper side and lower side FET21 to FET24 are connected to the upper side and lower side FET21 to FET24, respectively.

The input of the photo-coupler FC21 for turning on/off the upper side FET21 is connected to an FET control voltage line of +15 V via a diode D22 and the output of the photo-coupler FC21 is connected to the gate side of the FET21. A resistor 21 is connected in series to the photo-coupler FC21. The lower side FET 22 is connected in series to the photo-coupler FC21, the resistor 21, and the condenser C21.

The input of the photo-coupler FC22 for turning on/off the lower side FET22 is connected to an FET control voltage line with +15 V via a diode D21 and the output of the photo-coupler FC22 is connected to the gate side of the FET22 and is connected to the earth via a resistor22. In this respect, the upper side FET 21 and the lower side FET 22 are connected in series and a current is passed through the W-phase of the stator coil of the brushless motor from a connecting point of the FET21 and the FET 22.

The motion of the power circuit 20 will be described. In this respect, when the W-phase of the stator coil is excited, the photo-couplers FC21 and FC24 shown in FIG. 9 are turned on by the signal from the CPU 14 shown in FIG. 2 and the upper side FET 21 is turned on by the photo-coupler FC21 and the lower side FET 24 is turned on by the photo-coupler FC24 to impress the power source voltage Vcc on the W-phase of the coil. In this respect, the current from the FET control voltage line of +15 V is passed through the FET24 via the diode D23 and the condenser C23 to charge the charges with the polarity shown in FIG. 9 in the condenser C23.

Next, when the U-phase of the stator coil is excited, the photo-couplers FC23 and FC22 are turned on. In this respect, when the photo-coupler FC23 is turned on, the charges charged in the condenser C23 when the above-described FET24 is turned on are impressed on the gate of the FET 23 through the photo-coupler FC23 to turn on the FET23. On the other hand, when the photo-coupler FC22 is turned on, the current from the FET control voltage line of +15 V is passed to the earth side via the diode D22, the photo-coupler FC22 and the resistor R22 to apply an electric potential divided by the resistor R22 to the gate side of the FET22, which turns on the FET22. When the FET23 and FET22 are turned on, the power source voltage Vcc is impressed on the coil of U-phase. Moreover, when the FET 22 is turned on, the condenser C21 is charged in the polarity shown in the drawing.

As described above, when the lower side FET22 and FET24 are turned on by the lower side photo-couplers FC22 and FC24, the condensers C21 and C23 connected in series to the lower side FET22 and FET24 are charged and the upper side FET 21 and FET23 are turned on by the charged charges or by the upper side photo-couplers FC21 and FC23 connected in parallel to the condensers C21 and C23. Therefore, the upper side and lower side FET21 to FET24 of the driving circuit for the three-phase brushless motor can be driven by a single power source (FET control voltage of +15 V).

In the driving circuit for the brushless motor, the control system is switched for the high rotational speed and for the low rotational speed. The switching of the control system will be described with reference to FIG. 10. First, the control when the brushless motor is rotated at a high speed (40,000 revolutions/min) by the driving circuit (the answer of a step S52 is NO) will be described (S58).

The driving circuit for the brushless motor detects the number of revolutions by the signal from the Hall IC 10 and performs a speed feedback control when the brushless motor is rotated at high speeds over the set number of revolutions of 1000 to 5000 revolutions/min. In this respect, a current is passed through the coil of the motor by using two-phase square wave PWM control system having a phase difference of 60°.

In the other words, the Hall IC detects the polarity of the field magnet 52 mounted on the rotor 50 of the brushless motor and outputs the signal thereof. The D/A conversion circuit 19 smoothes the signal and converts the rotational speed of the brushless motor into a voltage value to produce a DA signal. Then, the comparator 16 compares the DA signal with the triangular wave generated by the triangular generating circuit 18 to produce a square wave PWM signal shown in FIGS. 4(a), (b) as in the case of the first preferred embodiment. The square wave PWM signal outputs a short square wave having a wave width of t1 and a specified period T (for example, 20 KHz), as shown in FIG. 4(a), when the actual speed equals to a target speed and a long square wave having a wave width of t1' and a specified period T (for example, 20 KHz), as shown in FIG. 4(b), when the actual speed is lower than the target speed.

The CPU14 detects a relative position of the coil 62 and the field magnet 52 based on the signal of the Hall IC 10 from a waveform forming circuit 12 and generates a driving signal for the power circuit 20 based on the PWM output from the comparator 16. When the brushless motor is rotated at high speeds, the number of revolutions is directly detected and is fed back, which can realize a rotational speed with a high accuracy.

Next, a control of the driving circuit when the brushless motor is rotated at an ultra-low rotational speed (dozens of revolutions/min) (an answer of the step S52 shown in FIG. 10 is YES) will be described (S54).

When the brushless motor is rotated at low speeds of less than the set number of revolutions of 1,000 to 5,000 revolutions/min, the driving circuit for the brushless motor switches the square wave PWM system of speed feedback control when the brushless motor is rotated at high speeds as described above to the sine wave PWM system of torque feedback control to control the brushless motor. In other words, the load is detected by a phase difference between the magnetic pole position of the field magnet and the coil exciting voltage waveform, and the crest value of the sine wave is changed in response to the load to generate a D/A signal. The D/A signal is compared with the load and the coil is excited by the exciting command from the sine wave by use of a two-phase sine-wave PWM control system having a phase difference of 60° (S54).

In this respect, the CPU 14 detects the load by the phase difference of the magnetic pole position of the field magnet and the coil exciting voltage waveform to excite the coil of the brushless motor so that the motor is not out of phase. In this regard, the CPU 14 combines two sine waves with a triangular wave as shown in FIG. 4(c) to produce a sine-wave PWM signal shown in FIG. 4(f). Since the crest value of the sine wave is controlled in response to the torque greatly fluctuated by the load in the second preferred embodiment, an out-of-phase phenomenon which is apt to occur in the periodic rotation can be previously prevented.

Moreover, if the square wave PWM signal is impressed on the brushless motor at low speeds, the brushless motor is intermittently rotated but the sine-wave PWM signal is impressed in the present embodiment and hence the brushless motor can be smoothly rotated.

In the second preferred embodiment, since the control system of the brushless motor is switched for the low speed (sine-wave PWM system) and for the high speed (square-wave PWM system), the circuit constitution and control action of the CPU are made complex, but the three-phase brushless motor is excited by two phases and hence produces a merit of easily constituting the control mechanism thereof. In particular, if the range of uses can be limited to the low speed range or the high speed range according to the use, the control mechanism can be easily constituted.

Moreover, since the driving circuit of the second preferred embodiment detects the number of revolutions based on the output of the Hall IC for detecting the polarity of the field magnet when it controls the brushless motor at high speeds, as is the case with the first preferred embodiment, a high speed feedback control can be performed without using an element for detecting the number of revolutions. On the contrary, when the driving circuit controls the brushless motor at low speeds, the output of the Hall IC of the driving circuit is not sufficient in the amount of information for the driving circuit to detect the number of revolutions and to perform the feedback control. Therefore, when the brushless motor is rotated at low speeds, the torque is detected and a torque feedback control is performed based on the load to stabilize the rotation of the brushless motor.

Further, when the brushless motor is rotated at low speeds (less than the set number of revolutions of 1,000 to 5,000 revolutions/min), it is driven by the sine-wave PWM system and, when the brushless motor is rotated at high speeds (not less than the set number of revolutions of 1,000 to 5,000 revolutions/min), it is driven by the square-wave PWM system, which can stably drive the brushless motor at low speeds and high speeds.

Still further, four power sources for the FETs are required in the conventional FET bridge of two-phase type (three power sources are required when they are shared between the upper and lower FETs), but a single power source can switch all of the FETs in the second preferred embodiment.

Next, the third preferred embodiment in which the constitution of the present invention is applied to a motor driving circuit of a single-phase type will be described with reference to FIG. 11.

In this preferred embodiment, a condenser C31 is connected in parallel to the photo-coupler FC31 for turning on/off the upper side FET 31. In this regard, when the lower side FET 32 is turned on, the condenser C31 connected in series to the FET 32 is charged. Then, when the photo-coupler FC31 is turned on, the charges charged in the condenser C31 turns on the FET32.

Moreover, in the constitution of the third preferred embodiment, while the brushless motor M is stopped, when the lower side FET 32 is turned on, the condenser C31 is charged and hence the upper side FET 31 is quickly turned on when the brushless motor M is restarted.

Two power sources for the FETs are required in the conventional FET bridge of single-phase type, but a single power source can switch two FETs in the third preferred embodiment. In this respect, although the single-phase driving circuit, two-phase driving circuit and three-phase driving circuit have been described in the above-described third, second and first embodiments, it is needless to say that the present invention can be applied to the driving circuit of not less than four-phase.

What is claimed is:

1. A driving circuit for a three-phase brushless motor, comprising:

a rotor having a field magnet;

a stator having a first phase coil, a second phase coil and a third phase coil for rotating the rotor;

a Hall effect sensor for detecting the positions of magnetic poles corresponding to said first phase coil, second phase coil and third phase coil; and a controller for producing a sinusoidal Pulse Width Modulation (PWM) signal having three phases with a phase difference of 120° or a square-wave PWM signal based on a three-phase 120° conduction type;

wherein said brushless motor, when rotated at low speeds, is driven by exciting said first phase coil, second phase coil and third phase coil by the sinusoidal PWM signal having a phase difference of 120° produced by said controller; and wherein said brushless motor, when rotated at high speeds, is driven by the square-wave PWM signal based on a three-phase 120° conduction type produced by said controller.

2. The driving circuit for a three-phase brushless motor as claimed in claim 1, further comprising:

a device for sensing the phase of the exciting wave form produced by said controller;

wherein, when said brushless motor is rotated at low speeds, at least one phase difference between the positions of magnetic poles detected by said Hall effect sensor and the exciting voltage waveforms of the coils of the first phase, the second phase and the third phase is detected by said sensing device and said controller performs a torque control by adjusting a crest value of the PWM signal in response to the phase difference so that a phase difference not exceeding 60° is obtained.

3. The driving circuit for a three-phase brushless motor as claimed in claim 1 or claim 2, further comprising:

a device for producing a multiplying or dividing ratio of the signal of said Hall effect sensor;

wherein, when said brushless motor is rotated at high speeds, the number of revolutions is detected due to the signal of said Hall effect sensor to produce a speed control and the multiplying ratio or the dividing ratio of the signal of said Hall effect sensor is switched by said device for producing a multiplying or dividing ratio in response to the number of revolutions to perform a speed control without the accuracy of detecting the number of revolutions being deteriorated.

4. A driving circuit for a single-phase or multi-phase motor, comprising:

upper side MOSFETs (FETs) connected to a high electric potential side;

an upper side control circuit for turning on/off the upper side FETs;

lower side FETs connected to the earth or a minus electric potential;

a lower side control circuit for turning on/off the lower side FETs; and condensers disposed in series to said lower side FETs and in parallel to said upper side control circuit;

said upper side FETs being connected in series to said lower side FETs to form bridge circuits, said upper side FETs and said lower side FETs being switched by a pulse width modulation (PWM) control, said condensers being charged and said upper side FETs being turned on by said upper side control circuit, when said lower side FETs are turned on by said lower side control circuit, by use of the electric charges charged to said condensers to drive said driving circuit for the single-phase or multi-phase motor by a single power source, wherein there is a sequence such that, when a power supply is stopped, said upper side FETs are turned off by said upper side control circuit and said lower side FETs are turned on by said lower side control circuit to charge said condensers.

5. The driving circuit for a single-phase or multi-phase motor as claimed in claim 4, further comprising:

a device for detecting the rotation state and the stop state of the motor; and a device for setting a predetermined interval of time;

wherein said detecting device detects the rotation state and the stop state of the motor and, when said motor is stopped for a time of not less than the predetermined time set on said setting device, said condensers are charged until the next rotation command is given and the motor is short-circuited and braked.

6. The driving circuit for a single-phase or multi-phase motor as claimed in claim 4 or claim 5, wherein said upper side control circuit and said lower side control circuit comprise photo-couplers.

7. A driving circuit for a three-phase brushless motor, comprising:

a rotor having a field magnet;

radial air bearings for rotatably supporting the rotor;

a stator composed of a first phase coil, a second phase coil, and a third phase coil which are disposed on the outer peripheral surfaces of the radial air bearings and rotate the rotor; and a controller for producing a two-phase sinusoidal wave PWM exciting signal having a phase difference of 60° or a two-phase square-wave exciting signal having a phase difference of 60°;

wherein, when said brushless motor is rotated at low speeds, the two-phase sinusoidal wave PWM exciting signal having a phase difference of 60° produced by said controller is given to said coils and wherein, when said brushless motor is rotated at high speeds, the two-phase square wave PWM exciting signal having a phase difference of 60° produced by said controller is given to said coils.

\* \* \* \* \*